3,034,864
SULFUR RECOVERY

Sydney Nashner, Roslyn, N.Y., and Frank A. Forward, Vancouver, British Columbia, Canada; Harry Odle executor of said Sydney Nashner, deceased, assignors, by mesne assignments, to Sherritt Gordon Mines Limited, Toronto, Ontario, Canada, an Ontario corporation
No Drawing. Filed May 11, 1953, Ser. No. 354,396
11 Claims. (Cl. 23—224)

This invention relates to the production of sulfur. More particularly, it relates to a method of producing elemental sulfur from pyrrhotitic mineral sulfides.

The potential economic value of the sulfur contained in mineral sulfide ores and concentrates has long been recognized and various methods for its recovery are well known and are in wide spread use. Existing methods of recovering sulfur values from mineral sulfide ores and concentrates heretofore have usually been associated with the treatment of metal bearing sulfide ores and concentrates in the concentration of and primarily for the extraction of metal values, such as in oxidizing roasting and smelting operations wherein the effluent combustion gases are treated for the recovery of sulfur dioxide. Such prior art methods of recovering sulfur dioxide from roaster and smelter gases are incidental to the recovery of metal values which is the primary objective of such methods and, originally, were designed to separate sulfur dioxide from the combustion gases so the gases could be released to the atmosphere without harmful effect on the vegetation. However, due to progressively increasing demands for sulfur by industries and the gradual depletion of cheap and readily available sources of elemental sulfur, methods of treating mineral sulfides primarily for the recovery of sulfur values are being closely investigated. For example, smelting methods have been devised by means of which a gas which contains up to about 75% sulfur dioxide is produced, from which substantially pure sulfur dioxide can be recovered. Other methods involve roasting pyrite and pyrrhotite primarily for the recovery of sulfur dioxide.

Prior art methods, however, have the disadvantages that sulfur dioxide bearing gases recovered from pyrometallurgical operations, such as smelting and oxidizing roasting operations usually contain dust particles which must be separated from the gases. Also, the sulfur dioxide content usually is relatively low thereby necessitating the installation and operation of costly gas treating equipment. Also, of course, the sulfur content of the starting material is recovered from these processes as sulfur dioxide and the production of elemental sulfur therefrom requires the use of methods and apparatus for reducing the sulfur dioxide to elemental sulphur.

It is a primary object of this invention to provide a process for treating pyrrhotitic mineral sulfide ores and concentrates to recover the sulfur content therefrom. Such a process should recover the sulfur content as elemental sulfur so as to be free of the various disadvantages noted above. It should be a relative simple chemical process, involving the use of inexpensive and readily available chemical reagents. In addition, it should be capable of practice in conventional equipment. Surprisingly, the objects of this invention have been met in a very effective manner. This is particularly true in view of the fact that previous processes of treating pyrrhotitic mineral sulfides have resulted in recovery of the sulfur only as sulfur dioxide. In contrast, it has now been discovered, according to this invention, that such material can be treated to produce a high yield of elemental sulfur.

In general, the process may be simply stated. Comminuted pyrrhotitic mineral sulfide ores or concentrate is slurried with water or an aqueous acid sulfate solution. The slurry is then treated at superatmospheric temperature and pressure with an oxidizing gas. Treatment is continued until sulfur in the mineral sulfide is oxidized to elemental sulfur. Resulting elemental sulfur is then separated from the undissolved residue.

The starting material is described as pyrrhotitic mineral sulfides. This is intended to mean that the sulfur content of the material is combined in a form similar to that in which it is combined in pyrrhotite, an iron sulfide having the general formula $Fe_xS_{x+1}$ wherein $x$ is greater than 1, for example, $Fe_7S_8$ to $Fe_{11}S_{12}$. The pyrrhotitic mineral sulfide materials to which this invention is applicable, therefore, may be broadly represented by the formula $Me_xS_{x+1}$ wherein "Me" represents a metal and $x$ again is greater than 1. Pyrite, $FeS_2$, can be roasted in an atmosphere free of oxygen or containing less than half the stoichiometric amount necessary to convert all the sulfide sulfur to sulfur dioxide, leaving a product having a composition within the above defined general formula. This product has the characteristics of pyrrhotite insofar as the sulfur content is concerned and as such is a pyrrhotitic material within the terms of this disclosure and is ideally adapted for treatment in the present method. Other materials such as digenite, marcasite, arsenopyrite, tetrahedrite, bornite, chalcopyrite, and the like can be readily treated as such according to the process of this invention, or, if necessary, first treated in a manner similar to that described above with respect to pyrite.

The primary object of this invention is to produce elemental sulfur. The pyrrhotitic mineral sulfides, therefore, may be barren of economically recoverable non-ferrous metals. On the other hand, it may be associated with non-ferrous mineral sulfides which add to the potential economic value of the starting material. Such non-ferrous metals associated with pyrrhotitic material include for instance, copper, zinc, gold, silver, members of the platinum group, cobalt, nickel and cadmium.

Although the above general statement of the process has been simply expressed, there are condititions which must be observed to obtain optimum results.

Pyrrhotitic mineral sulfide material to be treated by the present method is preferably finely pulverized. When slurried, a relatively uniform dispersion of particles is obtained which exposes maximum surface area to the oxidizing gas and the aqueous acid sulfate solution. While the size of the material may vary widely, it has been found that reaction rate and extraction of sulfur are best when the starting material is of the order of from about 35 to about 325 mesh standard Tyler screen. Mineral sulfides received from preliminary concentrating processes, such as from flotation cells, may be of the order of from 100 to 325 mesh and may be passed directly into the method of this invention. Material which has otherwise not been reduced in size may be pulverized to about 35 mesh or finer.

Pulverized pyrrhotitic mineral sulfide material is slurried preferably in the reaction vessel. The slurrying medium is an aqueous acid sulfate solution. At the start of an operation, however, water may be employed since under reaction conditions some acid sulfate is rapidly formed. If the process is conducted batchwise, therefore, water or dilute sulfuric acid solution can be employed at the start. On the other hand, water and mineral sulfides can be charged into the reaction vessel in a continuous fashion and undissolved residue, with which the elemental sulfur will be mixed, and aqueous acid sulfate solution withdrawn from the vessel in the same manner.

Pulp density of the resultant slurry influences the rate of oxidation of the sulfide sulfur to elemental sulfur. While the pulp density may vary considerably, a very satisfactory range is from about 35% to about 46% solids.

This range of densities provides for a rapid rate of oxidation.

Theoretically, the oxidation reaction may be conducted at temperatures as high as the boiling point of sulfur. In practice, however, the reaction will be conducted at temperatures of from about 100° F. to about 290° F. While the reaction proceeds at temperatures below 100° F., it is so slow as to be impractical for large scale operations. At temperatures above about 290° F. the viscosity of the elemental sulfur is too high to permit satisfactory recoveries. Optimum results are obtained within a narrow temperature range of from slightly below to slightly above the melting temperature of sulfur, i.e., from about 230° F. to about 260° F. Within this range the oxidation proceeds rapidly with a high degree of extractive efficiency. At higher temperatures occlusion of sulfide particles occurs in initially produced viscous elemental sulfur. Further oxidation of these particles is restricted, thus decreasing the yield of elemental sulfur. In addition, these higher temperatures favor sulfate formation which further decreases the yield.

When oxidation is conducted at a temperature slightly below the melting point of sulfur, the sulfur formed is in finely divided condition and difficult to recover as such. Accordingly, the temperature is raised to above the melting point so as to agglomerate the elemental sulfur into liquid droplets. These liquid droplets are then solidified into pellets or pebbles by reducing the temperature below the melting temperature of the sulfur. Cooling may be done by any suitable means but preferably is accomplished by dilution with unheated solution. Alternatively, the oxidation may be conducted at a temperature slightly above the melting point of the sulfur and the liquid droplets of sulfur so formed solidified by reducing the temperature below the melting point of sulfur. In either case, the temperature must be reduced below the melting point of sulfur before separation to solidify agglomerates and to facilitate handling at atmospheric pressure.

Usually, the oxidation of the sulfide sulfur contained in the starting material provides sufficient heat for the oxidation reaction. However, if this heat is not sufficient, additional heat may be provided by any suitable means. Also, if the autogenous heat of the reaction tends to raise the temperature beyond the desired limits, the temperature can be controlled by suitable means such as cooling coils.

The total pressure at which the reaction is conducted is, of course, the pressure autogenously generated by the temperature plus the partial pressure of the oxidizing gas. The oxidizing gas may be oxygen, oxygen enriched air or air. The most satisfactory results as regards velocity and extraction are obtained with a partial pressure of oxygen of about 25 p.s.i. to about 100 p.s.i. While oxygen partial pressures less than 25 p.s.i. are operable, their use is uneconomical because of the extended period required to complete extraction. Pressures higher than about 100 p.s.i. can be employed but also are uneconomical because of inherent pumping difficulties and the necessary use of heavier autoclaves. Such higher pressures may be desired, however, if non-ferrous metals are present in the starting material.

During oxidation, slurry should be agitated to ensure a uniform dispersion necessary for maximum reaction with the oxidizing gas. Agitation may also be continued after oxidation to aid in coalescing elemental sulfur. The size of the liquid sulfur droplets or agglomerates is influenced by the extent and intensity of agitation as well as temperature. In general, the greater the intensity and extent of agitation and the higher the temperature up to about 290° F., the larger the liquid droplets of sulfur. During cooling, agitation should be stopped to avoid breaking up the sulfur pellets.

Elemental sulfur formed in the oxidation reaction reports in the undissolved residue from which it can be separated by screening or other means. For example, a mixture of solids in solution withdrawn from the reaction vessel can be passed over a screen having openings of a size sufficient to retain the sulfur pellets while passing the solution and the undissolved residue. Alternatively, the mixture from the reaction vessel can be de-watered by suitable means, repulped in water or another solution, and sulfur separated.

The following examples further demonstrate the process. These examples are illustrative only and not meant to be limiting.

The material treated in Examples 1–7 was a fairly pure pyrrhotite. In each example the slurry was agitated to maintain a relatively uniform suspension of particles and a maximum diffusion of oxidizing gas. Size of particles employed was about 100% minus 200 mesh.

Table I

| Example | Time (hr.) | Temp. (°F.) | $O_2$ Part. Press. (p.s.i.) | Pulp Density (percent) | Sulfur Yield (percent) |
|---|---|---|---|---|---|
| 1 | ½ | 250 | 100 | 43–46 | 67.5 |
| 2 | 1 | 250 | 100 | 43–46 | 88 |
| 3 | 2 | 250 | 100 | 38 | 82 |
| 4 | 2 | 250 | 100 | 43–46 | 84 |
| 5 | 2 | 230 | 100 | 46 | 82.9 |
| 6 | 2 | 250 | 100 | 35 | 85.1 |
| 7 | 2 | 280 | 50 | 43–44 | 79.9 |

Table I shows that fairly pure pyrrhotite treated as slurries of about 35%–45% solids for one to two hours at 230° F. to 250° F. and an oxygen partial pressure of about 100 p.s.i. results in yields of elemental sulfur up to about 88% theoretical. This sulfur is recovered in the form of pellets or pebbles of about 97% to about 99% pure elemental sulfur.

The procedure of Examples 1–7 was repeated using a pyrrhotitic material having an analysis of 12.1% nickel, 1.45% copper and 28.2% sulfur.

Table II

| Example | Time (hr.) | Temp. (°F.) | $O_2$ Part. Press. (p.s.i.) | Sulfur Yield (percent) | Sulfur Purity (percent) |
|---|---|---|---|---|---|
| 8 | 4 | 221 (2 hrs) | 85 | 64.5 | 59 |
|   |   | 300 (2 hrs) | 105 |   |   |
| 9 | 9 | 212–221 (8 hrs.) | 105 | 39 | 70.6 |
|   |   | 300–320 (1 hr) | 105 |   |   |

A comparison of Tables I and II shows that the presence of non-ferrous metals in the pyrrhotitic material results in a lower sulfur yield and purity even after a much longer treatment period. The lower purity may also be attributed in part to the higher temperatures employed as compared to those used in Examples 1–7. The purity may be raised by remelting the sulfur and separating the non-ferrous metals by filtration.

The effect of adding sulfuric acid when using a pyrrhotitic starting material containing non-ferrous metals is shown by Examples 10 and 11.

Table III

| Example | Time (hr.) | Temp. (°F.) | $H_2SO_4$ Added | $O_2$ Part. Press. (p.s.i.) | Sulfur Yield (percent) |
|---|---|---|---|---|---|
| 10 | 2 | 230 | No | 185 | 46.1 |
| 11 | 2 | 230 | Yes | 185 | 73 |

Table III shows that addition of sulfuric acid increases the yield of sulfur in the low temperature oxidation treatment of this invention when treating pyrrhotitic material containing non-ferrous metals.

We claim:

1. The method of producing elemental sulphur which comprises the steps of dispersing pyrrhotitic mineral sulphide particles of a size within the range of from about 35 to about 325 mesh standard Tyler screen in an aqueous medium of the group consisting of water and aqueous sulphuric acid solution to form a slurry, reacting the aqueous slurry with a free oxygen bearing, oxidizing gas at a temperature within the range of from about 200° to about 290° F. and under a partial pressure of oxygen above about 25 pounds per square inch, continuing the oxidation step for a period of time sufficient to convert sulphide sulphur contained in the pyrrhotitic mineral sulphides to elemental sulphur, conducting at least part of the treatment at a temperature above the melting temperature of sulphur to agglomerate elemental sulphur into liquid sulphur globules, cooling the slurry to a temperature below the melting temperature of sulphur to solidify the liquid sulphur globules and form solid sulphur pellets, and separating and recovering solidified elemental sulphur pellets from the slurry.

2. The method of producing elemental sulphur according to claim 1 in which the oxidation reaction is conducted concurrently with the agglomeration step at a temperature above the melting temperature of sulphur but below about 290° F.

3. The method of producing elemental sulphur according to claim 1 in which at least part of the oxidation step is conducted at a temperature below the melting temperature of sulphur but above about 200° F. and the agglomeration step is conducted at a temperature above the melting temperature of sulphur but below about 290° F., whereby elemental sulphur formed in the oxidation step is agglomerated into liquid sulphur globules.

4. A method for the direct extraction of sulphur in elemental form which comprises, suspending in water in finely divided form one of a group of solid materials consisting of the naturally occurring mineral pyrrhotite and iron monosulphide formed by heating pyrite to remove one atom of sulphur, agitating the aqueous suspension, admitting thereto oxygen under superatmospheric pressure, heating the suspension to a temperature not substantially less than 110° C. and not more than 140° C. to liberate elemental sulphur and separating liberated elemental sulphur from the suspension within a period of about two hours after the institution of said temperature.

5. A method for the direct extraction of sulphur in elemental form which comprises, suspending in water in finely divided form one of a group of solid materials consisting of the naturally occurring mineral pyrrhotite and iron monosulphide formed by heating pyrite to remove one atom of sulphur, agitating the aqueous suspension, admitting thereto oxygen under superatmospheric pressure, heating the suspension to a temperature not substantially less than 110° C. and not more than 140° C. to liberate elemental sulphur and separating liberated elemental sulphur from the suspension.

6. A method for the direct extraction of sulphur in elemental form which comprises suspending in an aqueous medium selected from the group consisting of water and dilute aqueous sulphuric acid solution in finely divided form one of a group of solid materials consisting of the naturally occurring mineral pyrrhotite and iron monosulphide formed by heating pyrite to remove one atom of sulphur, agitating the aqueous suspension, admitting thereto oxygen under superatmospheric pressure, heating the suspension to a temperature not substantially less than 110° C. and not more than 140° C. to liberate elemental sulphur and separating liberated elemental sulphur from the suspension.

7. A method for the direct extraction of sulphur in elemental form which comprises suspending in an aqueous medium selected from the group consisting of water and dilute aqueous sulphuric acid solution in finely divided form one of a group of solid materials consisting of the naturally occurring mineral pyrrhotite and iron monosulfide formed by heating pyrite to remove one atom of sulphur, agitating the aqueous suspension, admitting thereto a free oxygen bearing, oxidizing gas under superatmospheric pressure, heating the suspension to a temperature not substantially less than 110° C. and not more than 140° C. to liberate elemental sulphur and separating liberated elemental sulphur from the suspension.

8. A method for the direct extraction of sulphur in elemental form which comprises suspending pyrrhotite in finely divided form in an aqueous medium selected from the group consisting of water and dilute aqueous sulphuric acid solution, agitating the aqueous suspension, admitting thereto a free oxygen bearing, oxidizing gas under superatmospheric pressure, heating the suspension to a temperature not substantially less than 110° C. and not more than 140° C. to liberate elemental sulphur and separating liberated elemental sulphur from the suspension.

9. A method for the direct extraction of sulphur in elemental form, which comprises, suspending in water in finely divided form one of a group of solid materials consisting of the naturally occurring mineral pyrrhotite and iron monosulphide formed by heating pyrite to remove one atom of sulphur, agitating the aqueous suspension, admitting thereto oxygen under superatmospheric pressure, heating the suspension, and maintaining the temperature within the range from about 100° C. to about 140° C. and separating liberated elemental sulfur from the suspension within about two hours after the institution of said temperature.

10. A method for the direct extraction of sulphur in elemental form which comprises suspending the natural mineral pyrrhotite in finely divided form in water in a closed reaction zone, admitting oxygen under superatmospheric pressure to the reaction zone, heating the suspension to a temperature not substantially less than 110° C. agitating the suspension and maintaining the temperature at not more than 140° C. to liberate elemental sulphur and separating the liberated elemental sulphur from the suspension within about two hours after the institution of said temperature.

11. The method defined in claim 9 wherein the oxygen pressure is at least 100 pounds per square inch.

References Cited in the file of this patent

UNITED STATES PATENTS

| 1,672,924 | Bacon | June 12, 1928 |
| 2,537,842 | McGauley et al. | Jan. 9, 1951 |

FOREIGN PATENTS

| 528,500 | Germany | June 29, 1931 |
| 361,207 | Canada | Oct. 20, 1936 |

OTHER REFERENCES

Morgan: "American Gas Practise," 1931, volume 1, pages 806–807.

Mellor: "Comprehensive Treatise on Inorganic and Theoretical Chemistry," 1935, vol. XIV, page 137.